United States Patent
Iwabuchi

[11] Patent Number: 5,973,421
[45] Date of Patent: *Oct. 26, 1999

[54] VOICE COIL MOTOR ACTUATOR FOR MAGNETIC DISK DEVICE

[75] Inventor: Masanori Iwabuchi, Ibaraki, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/844,720

[22] Filed: Apr. 18, 1997

[30] Foreign Application Priority Data

Apr. 18, 1996 [JP] Japan ................................ 8-096644

[51] Int. Cl.$^6$ .......................... H02K 41/00; H02K 5/24; G11B 21/02
[52] U.S. Cl. ............................. 310/13; 310/51; 360/101
[58] Field of Search ........................ 310/13, 36, 51; 360/101, 105, 106, 107, 109

[56] References Cited

U.S. PATENT DOCUMENTS

| 3,064,146 | 11/1962 | Schoninger et al. | 310/36 |
| 5,270,887 | 12/1993 | Edwards et al. | 360/97.03 |
| 5,455,728 | 10/1995 | Edwards et al. | 360/105 |
| 5,581,424 | 12/1996 | Dunfield et al. | 360/105 |
| 5,729,406 | 3/1998 | Faris | 360/106 |

FOREIGN PATENT DOCUMENTS 1-259747  10/1989  Japan .
1-181165  12/1989  Japan .

*Primary Examiner*—Clayton LaBalle
*Attorney, Agent, or Firm*—Whitham, Curtis & Whitham

[57] ABSTRACT

A voice coil motor actuator for a magnetic disk device includes a pivot bearing shaft, a positioner, a magnet, and a coil. The positioner is pivotally supported by the pivot bearing shaft. The positioner has a distal end portion at which a magnetic head is mounted, and a proximal end portion projecting to a side opposite to the distal end portion with respect to the pivot bearing shaft. The magnet is fixed in correspondence with the pivot range of the proximal end portion of the positioner. The coil is arranged at the proximal end portion of the positioner to oppose the magnet. The coil has a pair of effective length portions which generate a magnetic flux to act on the magnet upon energization, thereby applying a pivot force to the positioner. The position of an intersection between the extended lines of the effective length portions of the coil is set between the pivot bearing shaft and the coil.

7 Claims, 4 Drawing Sheets

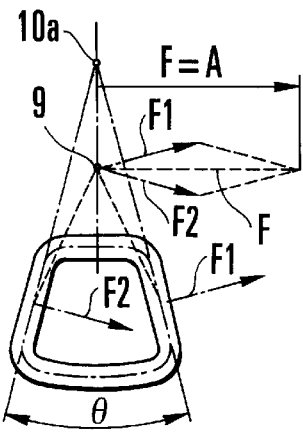
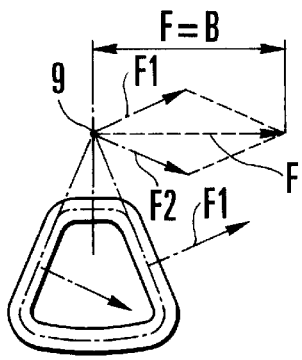
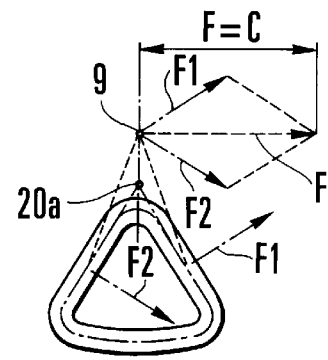
FIG. 2A　　　　FIG. 2B　　　　FIG. 2C
PRIOR ART
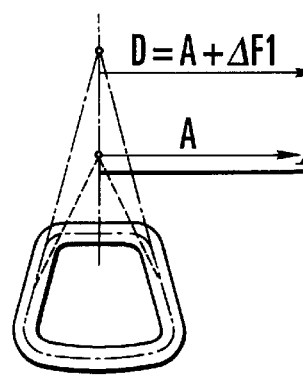
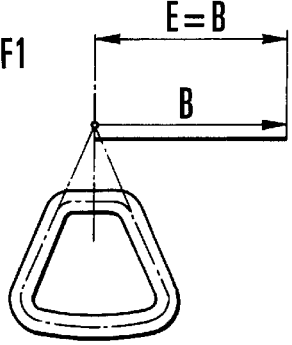
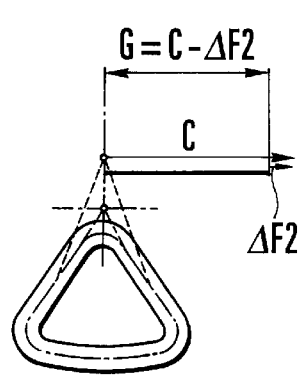
FIG. 3A　　　　FIG. 3B　　　　FIG. 3C
PRIOR ART
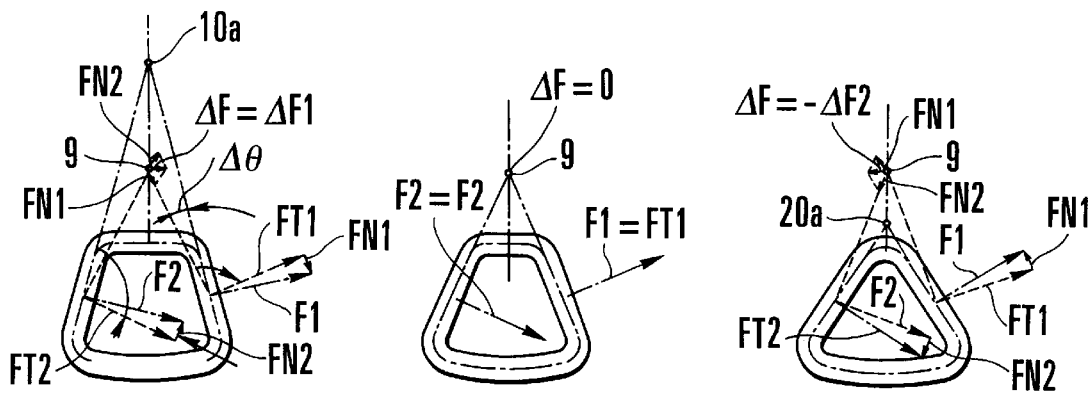
FIG. 4A　　　　FIG. 4B　　　　FIG. 4C
PRIOR ART

VOICE COIL MOTOR ACTUATOR FOR MAGNETIC DISK DEVICE

BACKGROUND OF THE INVENTION

The present invention relates to a voice coil motor actuator which performs the positioning operation of a magnetic head in order to record and reproduce information on and from a magnetic disk in a magnetic disk device and, more particularly, to a voice coil motor actuator for performing the positioning operation upon a pivot motion.

Of magnetic disk devices each performing the positioning operation of a magnetic head by a voice coil motor (VCM) actuator in order to record and reproduce information on and from a magnetic disk, a general magnetic disk device mounted with a voice coil actuator which performs the positioning operation upon a pivot or swing motion is shown in FIG. 3. Referring to FIG. 5, in a magnetic disk device 1, a slider 5 including a magnetic head is mounted on the distal end of a positioner 4 in order to record and reproduce information on and from a magnetic disk 2 which rotates together with a spindle motor 3. A coil 8 which constitutes a VCM actuator 6 is coupled to the proximal end of the positioner 4, and a magnet 7 is fixed to oppose the coil 8. A current is supplied to the coil 8 to perform a pivot motion about a pivot bearing shaft 9 of the coil 8 and the positioner 4, thereby positioning the slider 5 with respect to the magnetic disk 2.

The coil 8 of the conventional pivot (swing) VCM actuator 6 has an almost trapezoidal shape when viewed from the top, as shown in FIG. 6. Effective length portions 10 on the two sides of the trapezoidal shape which operate together with the magnet 7 to generate the driving force of the positioner 4 are almost parallel. Therefore, an effective length portion intersection 10a as an intersection between the extended lines of the effective length portions 10 is located on a side opposite to the coil 8 with respect to the pivot bearing shaft 9 serving as the center of the pivot motions of the coil 8 and the positioner 4.

As described above, in the conventional swing VCM actuator, the effective length portion intersection 10a of the coil 8 is located on the side opposite to the coil 8 with respect to the pivot bearing shaft 9. For this reason, when a rotation torque is generated by the VCM actuator 6, an external force other than this rotation torque acts on the pivot bearing shaft 9, resulting in increases in unnecessary vibration and noise.

SUMMARY OF THE INVENTION

It is an object of the present invention to provide a magnetic disk device in which a slider stably floats and noise is hardly generated.

In order to achieve the above object, according to the present invention, there is provided a voice coil motor actuator for a magnetic disk device, comprising a pivot bearing shaft, a positioner pivotally supported by the pivot bearing shaft, the positioner having a distal end portion at which a magnetic head is mounted, and a proximal end portion projecting to a side opposite to the distal end portion with respect to the pivot bearing shaft, a magnet fixed in correspondence with a pivot range of the proximal end portion of the positioner, and a coil arranged at the proximal end portion of the positioner to oppose the magnet, the coil having a pair of effective length portions which generate a magnetic flux to act on the magnet upon energization, thereby applying a pivot force to the positioner, wherein a position of an intersection between extended lines of the effective length portions of the coil is set between the pivot bearing shaft and the coil.

BRIEF DESCRIPTION OF THE DRAWINGS

FIGS. 2A to 2C are views for explaining resultant forces F used as rotation torques in a prior art, a comparative example, and the present invention, respectively;

FIGS. 3A to 3C are views for explaining resultant forces ΔF not used for the rotation torques in the prior art, the comparative example, and the present invention, respectively;

FIGS. 4A to 4C are views for explaining the resultant forces of the resultant forces F and ΔF in the prior art, the comparative example, and the present invention, respectively;

DESCRIPTION OF THE PREFERRED EMBODIMENT

The present invention will be described in detail below with reference to the accompanying drawings.

Figure 1:
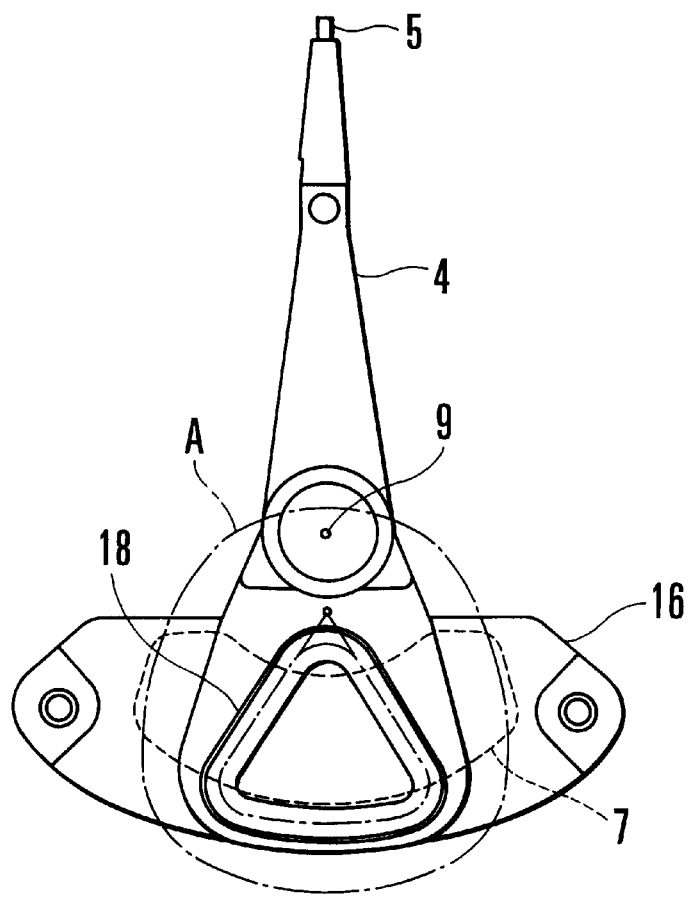
FIG. 1A is a plan view of a voice coil motor actuator according to an embodiment of the present invention.
FIG. 1B is an enlarged plan view of a portion A (coil portion) shown in FIG. 1A.
Figure 1:
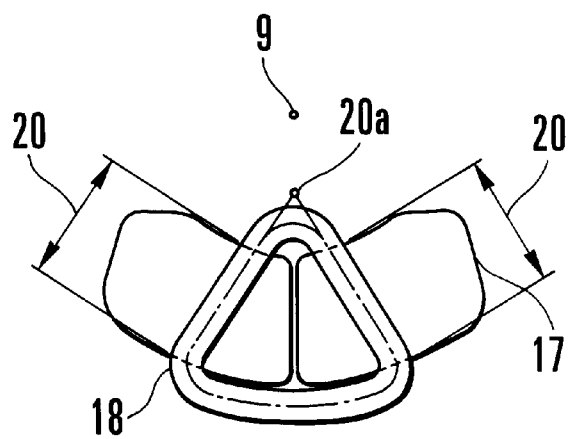
Figure 5:
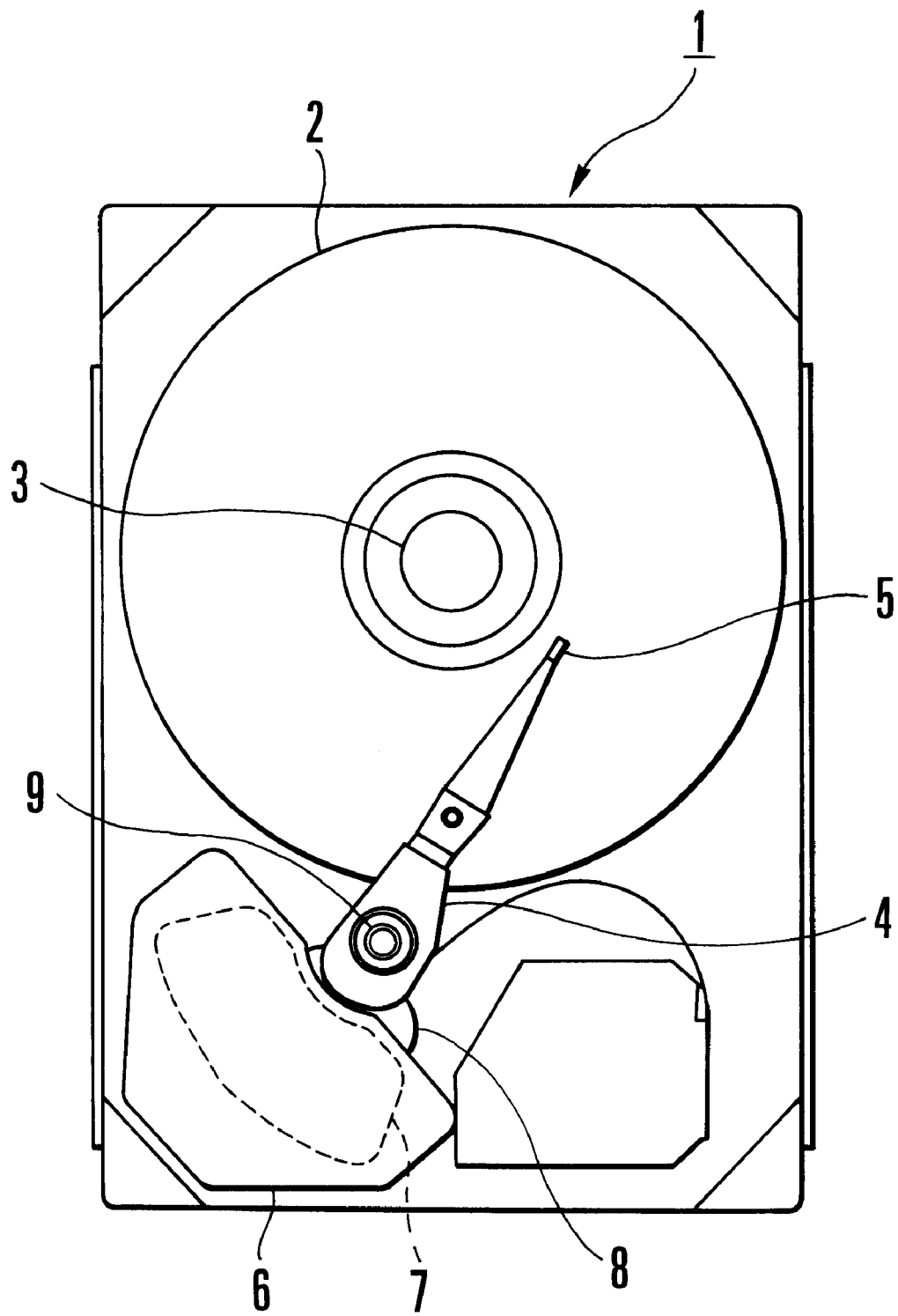
FIG. 5 is a plan view showing an example of a general magnetic disk device on which a pivot voice coil motor actuator is mounted.

FIG. 1A shows a VCM actuator according to an embodiment of the present invention. Referring to FIG. 1A, a positioner 4 on which a slider 5 is mounted at its distal end portion is pivotally supported by a pivot bearing shaft 9, and has a coil 18 constituting a VCM actuator 16 at its proximal end portion (carriage) projecting from the pivot bearing shaft 9 to a side opposite to the distal end portion. A magnet 7 is fixed in the pivot range of the coil 18 to oppose the coil 18. When a current is supplied to the coil 18, the magnetic flux is generated to act on the magnet 7. By the excited force, the coil 18 and the positioner 4 pivot about the pivot bearing shaft 9 to position the slider 5 with respect to the magnetic disk.

Figure 6:
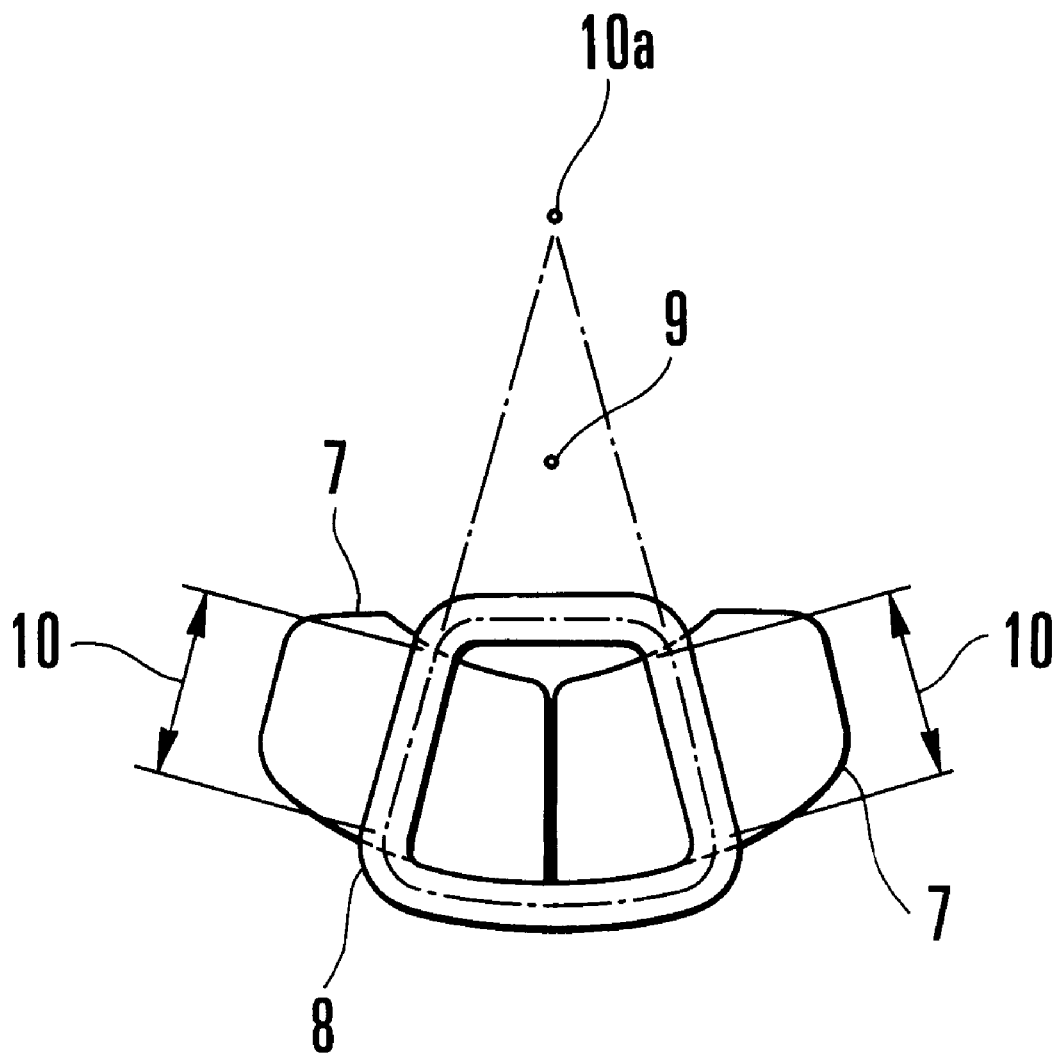
FIG. 6 is a plan view showing main part of the voice coil motor actuator of the conventional magnetic disk device.

The VCM actuator 16 of this embodiment has almost the same arrangement as that of the conventional VCM actuator 6 shown in FIG. 6 except that the shape of the coil 18 is slightly different. More specifically, while the shape of the coil 8 shown in FIG. 6 is almost trapezoidal, that of the coil 18 shown in FIG. 1A is an almost regular triangle. A winding is arcuately wound around the three vertex portions of the coil 18. Therefore, an effective length portion intersection 20a as an intersection between the extended lines of effective length portions 20 on the two sides of the coil 18 serving as winding portions opposite to the magnet 7 is located on the coil 18 side with respect to the pivot bearing shaft 9, i.e., between the pivot bearing shaft 9 and the coil 18, as shown in FIG. 1B.

Next, the operation of the VCM actuator 16 having the above arrangement will be described. That is, of forces generated upon energizing the coil, a force F applied to the pivot bearing shaft 9 is the resultant force of forces F1 and F2 which are generated in directions perpendicular to the right and left effective length portions, as shown in FIGS. 2A to 2C. As shown in FIG. 2A, F=A holds when the effective length portion intersection 10a is located on the side opposite to the coil with respect to the pivot bearing shaft 9 (prior art). As shown in FIG. 2B, F=B holds when the effective length portion intersection coincides with the pivot bearing shaft 9 (comparative example). As shown in FIG. 2C, F=C holds when the effective length portion intersection 20a is located on the coil side with respect to the pivot bearing shaft 9 (present invention). At this time, the relation A>B>C is established.

In addition, as shown in FIGS. 3A and 3B, of the forces F1 and F2 which are generated with respect to the right and left effective length portions upon energizing the coil, forces which are not converted into rotation torques FT1 and FT2 around the pivot bearing shaft 9 are defined as FN1 and FN2. As shown in FIG. 3A, the resultant force ΔF of FN1 and FN2 satisfies ΔF=ΔF1 when the effective length portion intersection 10a is located on the side opposite to the coil with respect to the pivot bearing shaft 9 (prior art). As shown in FIG. 3B, ΔF=0 holds when the effective length portion intersection coincides with the pivot bearing shaft 9 (comparative example). As shown in FIG. 3C, ΔF is in a direction opposite to F, i.e., ΔF=−ΔF2 when the effective length portion intersection 20a is located on the coil side with respect to the pivot bearing shaft 9 (present invention). At this time, the magnitudes of the rotation torques FT1 and FT2 are almost the same in FIGS. 3A to 3C. The losses of the rotation torques FT1 and FT2 are 2% or smaller when an angle Δθ defined by lines which respectively connect the effective length portion intersection and the pivot bearing shaft 9 to the center of the effective length portion is 10° or smaller.

As shown in FIG. 4A, the resultant force Fa=F+ΔF of F in FIGS. 2A to 2C and ΔF in FIGS. 3A to 3C satisfies Fa=D=F+ΔF=A+ΔF1 when the effective length portion intersection 10a is located on the side opposite to the coil with respect to the pivot bearing shaft 9 (prior art). As shown in FIG. 4B, the resultant force Fa satisfies Fa=E=F+ΔF=B when the effective length portion intersection coincides with the pivot bearing shaft 9 (comparative example). As shown in FIG. 4C, the resultant force Fa satisfies Fa=G=F+ΔF=C−ΔF2 when the effective length portion intersection 20a is located on the coil side with respect to the pivot bearing shaft 9 (present invention).

The order of the magnitudes of Fa is therefore D>E>G, and the resultant force Fa is minimized when the effective length portion intersection is located on the coil side with respect to the pivot bearing shaft. The magnitude of this external force Fa causes vibrations and noise around the pivot bearing shaft 9 when the positioning operation (seek operation) of the positioner 4 is performed by the VCM actuator. For this reason, by setting the effective length portion intersection on the coil side with respect to the pivot bearing shaft, a magnetic disk device in which a slider stably floats because of few vibrations and noise is hardly generated can be realized.

In this embodiment, the shape of the coil 18 is an almost regular triangle. However, this shape can be of a trapezoid having an upper side greatly shorter than a lower side, as a matter of course. In this case, as the length of the upper side is decreased to 0, the coil shape becomes triangular, as shown in FIGS. 1A and 1B.

As has been described above, in the voice coil motor actuator of the present invention, the effective length portion intersection as an intersection between the extended lines of the effective length portions on the two sides of the coil having an almost trapezoidal or triangular shape is set between the pivot bearing shaft and the coil to reduce the magnitude of the force which acts on the pivot bearing shaft and generates vibrations and noise. Therefore, a magnetic disk device in which a slider stably floats because of few vibrations and noise is hardly generated can be realized.

What is claimed is:

1. A voice coil motor actuator for a magnetic disk device, comprising:

a pivot bearing shaft;

a positioner pivotally supported by said pivot bearing shaft, said positioner having a distal end portion at which a magnetic head is mounted, and a proximal end portion projecting to a side opposite to said distal end portion with respect to said pivot bearing shaft;

a magnet fixed in correspondence with a pivot range of said proximal end portion of said positioner; and a coil arranged at said proximal end portion of said positioner to oppose said magnet, said coil having a pair of effective length portions each having a centerline therethrough and which generate a magnetic flux to act on said magnet upon energization, thereby applying a pivot force to said positioner, wherein said coil is positioned such that lines respectively extending from said centerlines of said effective length portions of said coil intersect between said pivot bearing shaft and said coil.

2. An actuator according to claim 1, wherein said coil has an almost triangular shape, and two hypotenuses of said coil constitute said effective length portions.

3. An actuator according to claim 2, wherein said coil has an arcuated winding portion at a vertex portion defined by said effective length portions.

4. An actuator according to claim 1, wherein said coil has an almost trapezoidal shape with an upper side greatly shorter than a lower side, and opposing hypotenuses of said coil constitute said effective length portions.

5. An actuator as claimed in claim 1, wherein:

said magnet includes a magnetic head, and said positioner has a distal end portion at which said magnetic head is mounted and a proximal end portion projecting to a side opposite to said distal end portion with respect to said pivot bearing shaft.

6. An actuator as claimed in claim 5, wherein coil is arranged at said proximal end portion of said positioner.

7. A voice coil motor actuator for a magnetic disk device, comprising:

a pivot bearing shaft;

a positioner pivotally supported by said pivot bearing shaft;

a magnet fixed in correspondence with a pivot range of said positioner; and coil means for providing a first force and a second force at the pivot bearing shaft, said second force opposing said first force, which is not converted into rotational torques about said pivot bearing shaft, said first force is added to said second force resulting in a resultant force about said pivot bearing shaft which is smaller than said first force, said coil means opposing said magnet.

* * * * *